(12) United States Patent
Andrikowich et al.

(10) Patent No.: US 9,768,675 B2
(45) Date of Patent: Sep. 19, 2017

(54) ELECTROMAGNETIC MOTOR

(71) Applicant: TA Instruments-Waters L.L.C., Milford, MA (US)

(72) Inventors: Tom Andrikowich, Whitinsville, MA (US); Troy D. Nickel, Minneapolis, MN (US)

(73) Assignee: TA Instruments-Waters L.L.C., Milford, MA (US)

( * ) Notice: Subject to any disclaimer, the term of this patent is extended or adjusted under 35 U.S.C. 154(b) by 0 days.

(21) Appl. No.: 15/349,618

(22) Filed: Nov. 11, 2016

(65) Prior Publication Data

US 2017/0163139 A1    Jun. 8, 2017

Related U.S. Application Data

(62) Division of application No. 13/591,938, filed on Aug. 22, 2012, now Pat. No. 9,496,778.

(51) Int. Cl.
| | |
|---|---|
| *H02K 41/02* | (2006.01) |
| *H02K 33/00* | (2006.01) |
| *H02K 5/04* | (2006.01) |
| *H02K 7/14* | (2006.01) |
| *H02K 33/16* | (2006.01) |
| *H02K 7/08* | (2006.01) |

(52) U.S. Cl.
CPC ............. *H02K 41/02* (2013.01); *H02K 5/04* (2013.01); *H02K 7/14* (2013.01); *H02K 7/08* (2013.01); *H02K 33/16* (2013.01); *H02K 2201/18* (2013.01)

(58) Field of Classification Search
CPC   H02K 41/02; H02K 5/04; H02K 7/14; H02K 33/16; H02K 7/08; H02K 2201/18

USPC .................. 310/12.32, 12.31; 417/363, 415; 267/160

See application file for complete search history.

(56) References Cited

U.S. PATENT DOCUMENTS

| | | |
|---|---|---|
| 3,336,488 A | 8/1967 | Scott |
| 3,746,937 A | 7/1973 | Koike |
| 3,794,865 A | 2/1974 | Guttinger |
| 4,139,214 A | 2/1979 | Meyer |
| 4,538,964 A | 9/1985 | Brown |
| 4,675,615 A | 6/1987 | Bramanti |
| 4,726,227 A | 2/1988 | Moffatt et al. |
| 5,216,723 A | 6/1993 | Froeschle et al. |
| 5,255,521 A * | 10/1993 | Watanabe ................. F25B 9/14 60/520 |
| 5,269,497 A | 12/1993 | Barth |

(Continued)

OTHER PUBLICATIONS

International Search Report and Written Opinion dated Dec. 9, 2013 for International application No. PCT/2013/055148.

*Primary Examiner* — Alex W Mok
(74) *Attorney, Agent, or Firm* — McCarter & English, LLP; Deborah M. Vernon; Heath T. Misley

(57) ABSTRACT

An electromagnetic motor includes a stator and an armature arranged to move substantially linearly relative to the stator in an intended direction during operation of the motor. A first and second flexure are connected to a first end of the armature. Each flexure has a longest portion which lies substantially in a plane that intersects a plane in which the armature lies at a substantially right angle. The flexures allow motion of the armature in the intended direction while resisting motion of the armature in one or more other degrees of freedom.

9 Claims, 6 Drawing Sheets

(56) References Cited

U.S. PATENT DOCUMENTS

| | | | |
|---|---|---|---|
| 5,293,782 | A | 3/1994 | Long et al. |
| 6,405,599 | B1 | 6/2002 | Patt |
| 6,991,217 | B2 | 1/2006 | Shimizu et al. |
| 7,216,859 | B2 | 5/2007 | Sebert |
| 7,304,407 | B2 | 12/2007 | Sanematsu et al. |
| 7,679,229 | B2 | 3/2010 | Mark |
| 7,694,593 | B2 | 4/2010 | Owens et al. |
| 7,896,623 | B2 * | 3/2011 | Hell ............... F04B 35/045 248/605 |
| 2004/0015042 | A1 | 1/2004 | Vincent et al. |
| 2007/0292286 | A1 | 12/2007 | Hell et al. |
| 2008/0008607 | A1 | 1/2008 | Schade et al. |
| 2008/0019852 | A1 | 1/2008 | Brand et al. |
| 2008/0089796 | A1 | 4/2008 | Schade et al. |
| 2008/0267797 | A1 | 10/2008 | Hell et al. |
| 2009/0129955 | A1 | 5/2009 | Schubert |
| 2010/0327673 | A1 | 12/2010 | Jun et al. |
| 2011/0063059 | A1 | 3/2011 | Takahashi et al. |
| 2011/0243365 | A1 | 10/2011 | Carlmark et al. |
| 2011/0243366 | A1 | 10/2011 | Carlmark et al. |

* cited by examiner (1)

ELECTROMAGNETIC MOTOR

RELATED APPLICATIONS

This application is a Divisional Application of U.S. patent application Ser. No. 13/591,938, to be issued as U.S. Pat. No. 9,496,778 and entitled "Electromagnetic Motor," which is owned by the assignee of the instant application and the disclosure of which is hereby incorporated by reference in its entirety.

BACKGROUND

Referring now to FIG. 1, there is shown a prior art linear motor 10 with a frictionless flexural suspension element 16 from U.S. Pat. No. 6,405,599. A stator assembly 12 includes a frame 11 to which a core portion 13 is mechanically attached. The frame 11 serves as an element which provides convenient coupling of the core portion 13 and other elements of the linear motor 10. Other embodiments of the stator assembly 12 may not require the frame 11. The frictionless flexural suspension system 16 holds an armature 14 in position relative to other linear motor elements and controls the motion of the armature 14 and may exert a restorative force along the axis 17 of the armature 14.

Referring to FIG. 2, there is shown the frame 11, frictionless flexural suspension system 16, and armature 14. For clarity, the core portion 13 is not shown. The frictionless flexural suspension system 16 includes two flexure components 46, 48. The ends of components 46, 48 may be attached to the frame 11 by multiple rivets through rivet holes at a pressure plate 15. The rivets "sandwich" the flexure components 46, 48 between the pressure plate 15 and the frame 11. The flexure components 46, 48 flex to allow motion along the axis 17 and may be made of stainless steel with a thickness of 0.33 mm (0.012 inches). There is a single flexure component 46, 48 at either end of the armature 14, and each flexure component has a longest portion which is substantially parallel with a longest portion of the other flexure component. Each flexure 46, 48 is attached to a central portion of an end of the armature 14.

SUMMARY

In one aspect, an electromagnetic motor includes a stator and an armature arranged to move substantially linearly relative to the stator in an intended direction during operation of the motor. A first and second flexure are connected to a first end of the armature. Each flexure has a longest portion which lies substantially in a plane that intersects a plane in which the armature lies at a substantially right angle. The flexures allow motion of the armature in the intended direction while resisting motion of the armature in one or more other degrees of freedom.

Embodiments may include one or more of the following features. The motor includes one or more permanent magnets that are secured to the armature. The longest portion of the first flexure is substantially parallel to the longest portion of the second flexure. The longest portion of the first flexure is skewed relative to the longest portion of the second flexure. The motor further includes a third flexure connected to the first end of the armature, the third flexure (a) having a longest portion which is skewed relative to at least one of the longest portions of the first and second flexures, and (b) allowing motion of the armature in the intended direction while resisting motion of the armature in one or more other degrees of freedom. The motor further includes a fourth flexure connected to the first end of the armature, the fourth flexure (a) having a longest portion which is skewed relative to at least two of the longest portions of the first through third flexures, and (b) allowing motion of the armature in the intended direction while resisting motion of the armature in one or more other degrees of freedom. The motor further includes a fifth flexure connected to a second end of the armature, the fifth flexure (a) having a longest portion which is skewed relative to at least one of the longest portions of the first through fourth flexures, and (b) allowing motion of the armature in the intended direction while resisting motion of the armature in one or more other degrees of freedom. The motor further includes a sixth flexure connected to the second end of the armature, the sixth flexure (a) having a longest portion which is skewed relative to at least one of the longest portions of the first through fifth flexures, and (b) allowing motion of the armature in the intended direction while resisting motion of the armature in one or more other degrees of freedom. The motor further includes a housing, and each flexure has two end portions which are connected to the housing and a central portion which is connected to a first end of the armature.

In another aspect, an electromagnetic motor includes a stator and an armature having a permanent magnet and arranged to move substantially linearly relative to the stator in an intended direction during operation of the motor. A first flexure is connected to a first end of the armature. A second flexure is connected to a second end of the armature. The permanent magnet is located between the first and second flexures. A longest portion of the first flexure is skewed relative to a longest portion of the second flexure. The flexures allow motion of the armature in the intended direction while resisting motion of the armature in one or more other degrees of freedom.

Embodiments may include any of the above features and/or the following. The motor further includes a third flexure connected to the first end of the armature, the third flexure (a) having a longest portion which is skewed relative to at least one of the longest portions of the first and second flexures, and (b) allowing motion of the armature in the intended direction while resisting motion of the armature in another degree of freedom. The motor further includes a fourth flexure connected to the first end of the armature, the fourth flexure (a) having a longest portion which is skewed relative to at least one of the longest portions of the first through third flexures, and (b) allowing motion of the armature in the intended direction while resisting motion of the armature in another degree of freedom. The motor further includes a fifth flexure connected to the first end of the armature, the fifth flexure (a) having a longest portion which is skewed relative to at least one of the longest portions of the first through fourth flexures, and (b) allowing motion of the armature in the intended direction while resisting motion of the armature in another degree of freedom. The motor further includes a sixth flexure connected to the second end of the armature, the sixth flexure (a) having a longest portion which is skewed relative to at least one of the longest portions of the first through fifth flexures, and (b) allowing motion of the armature in the intended direction while resisting motion of the armature in another degree of freedom. The motor further includes a housing, wherein each flexure has two end portions which are secured to the housing and a central portion which is secured to one of the first and second ends of the armature.

In another aspect, an electromagnetic motor includes a stator and an armature arranged to move relative to the stator in an intended direction during operation of the motor. A first and second flexure are connected to the armature. The flexures allow motion of the armature in the intended direction while resisting motion of the armature in one or more other degrees of freedom. An external load is attachable to the armature at two corners of the armature.

Embodiments may include any of the above features and/or the following. The motor further includes one or more permanent magnets that are secured to the armature. A longest portion of the first flexure is skewed relative to a longest portion of the second flexure. The armature is arranged to move substantially linearly.

In another aspect, an electromagnetic motor includes a stator and an armature. The stator and armature are arranged for substantially linear motion relative to each other in an intended direction during operation of the motor. A first and second flexure are connected to a first end of one of the stator and armature. Each flexure has a longest portion which lies substantially in a plane that intersects a plane in which the armature lies at a substantially right angle. The flexures allow motion of one of the stator and armature in the intended direction while resisting motion of one of the stator and armature in one or more other degrees of freedom.

DETAILED DESCRIPTION

The description below discloses a linear electromagnetic motor in which two pairs of flexural suspension elements (i.e. flexures) are connected to each end of an armature of the motor. These flexures allow frictionless movement of the armature in an intended direction of travel while providing resistance to movement of the armature in other degrees of freedom (translation, rotation). In some applications of the motor, loading in the transverse (or lateral) directions can be substantial and arbitrary in direction.

Figure 3:
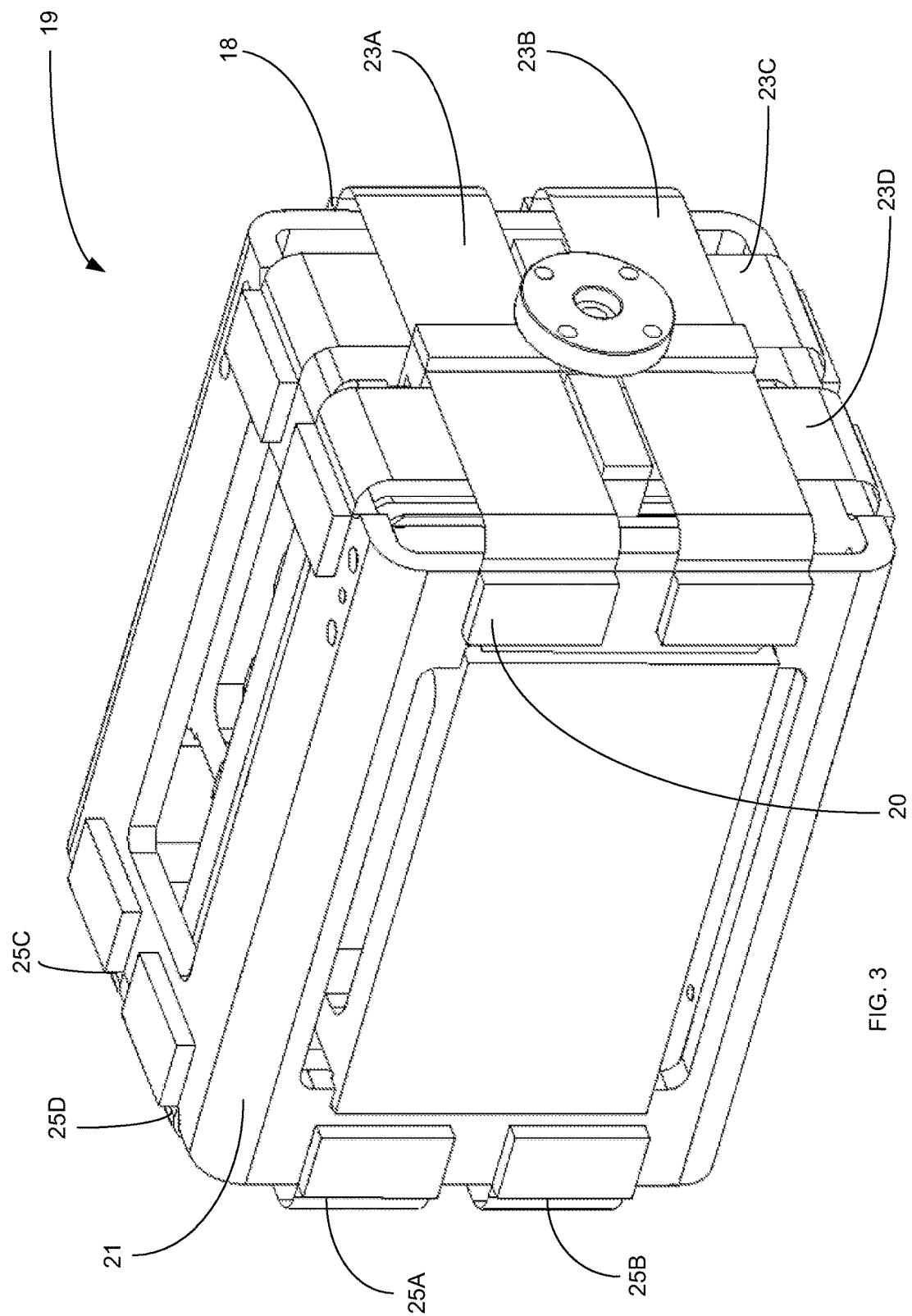
FIG. 3 is a perspective view of a linear electromagnetic motor.

With reference to FIG. 3, a linear electromagnetic motor 19 includes a housing 21. Four flexural suspension elements (i.e. flexures) 23A-D are located at one end of the motor 19, and four flexures 25A-D are located at the other end of the motor 19. Each flexure is connected to the housing 21 by riveting both end portions of a particular flexure to the housing (rivets not shown). For example, the flexure 23A is riveted to the housing 21 at locations 18 and 20. The ends of the flexures can be secured to the housing 21 in other ways (e.g. bolting, welding). These flexures are also connected to an armature of the motor and allow frictionless movement of the armature in an intended direction of travel (described in further detail below).

The material used for the flexure is selected based on various needs, such as the expected or targeted stress, strain, stiffness (e.g. to prevent the armature from contacting a stator of the motor 19), deflection capability, load handling capacity, number of duty cycles, and operating temperature. Each flexure may be formed from a single piece of flexible material, such as metal (e.g. spring steel), plastic (e.g., Dupont Vespel), or composite. In some examples, one material criteria for the flexure is that it exhibits high fatigue resistance, e.g., it can withstand a maximum stress over a billion cycles. High fatigue resistant (100 ksi or greater endurance limit) materials include, stainless steel alloys. Further details of flexures are disclosed in U.S. Pat. Nos. 6,405,599 and 7,679,229 which are incorporated into the instant application by reference thereto.

Stress, stiffness, size, and linearity are all interrelated in the design of flexures for a moving magnet motor. As size is decreased, for example, the behavior of the flexure (force exerted as a function of displacement) tends to become less linear. Reducing intrinsic stress in the flexure tends to make the behavior more linear. For a prescribed displacement, reducing stiffness allows the flexure to withstand greater applied stress. For a given application, i.e., a motor having particular operating characteristics and packaging constraints, a particular combination of intrinsic stress, stiffness, size, and linearity in the flexures and the ability to withstand the highest amount of applied stress can be achieved by varying the shape of the flexure. The flexures can be formed in several different ways, including stamping or forming, bending using a brake press, and bending with hand tools. The particular techniques used may depend on the material used and typical manufacturing considerations such as capacity, throughput, and quality control.

Figure 4:
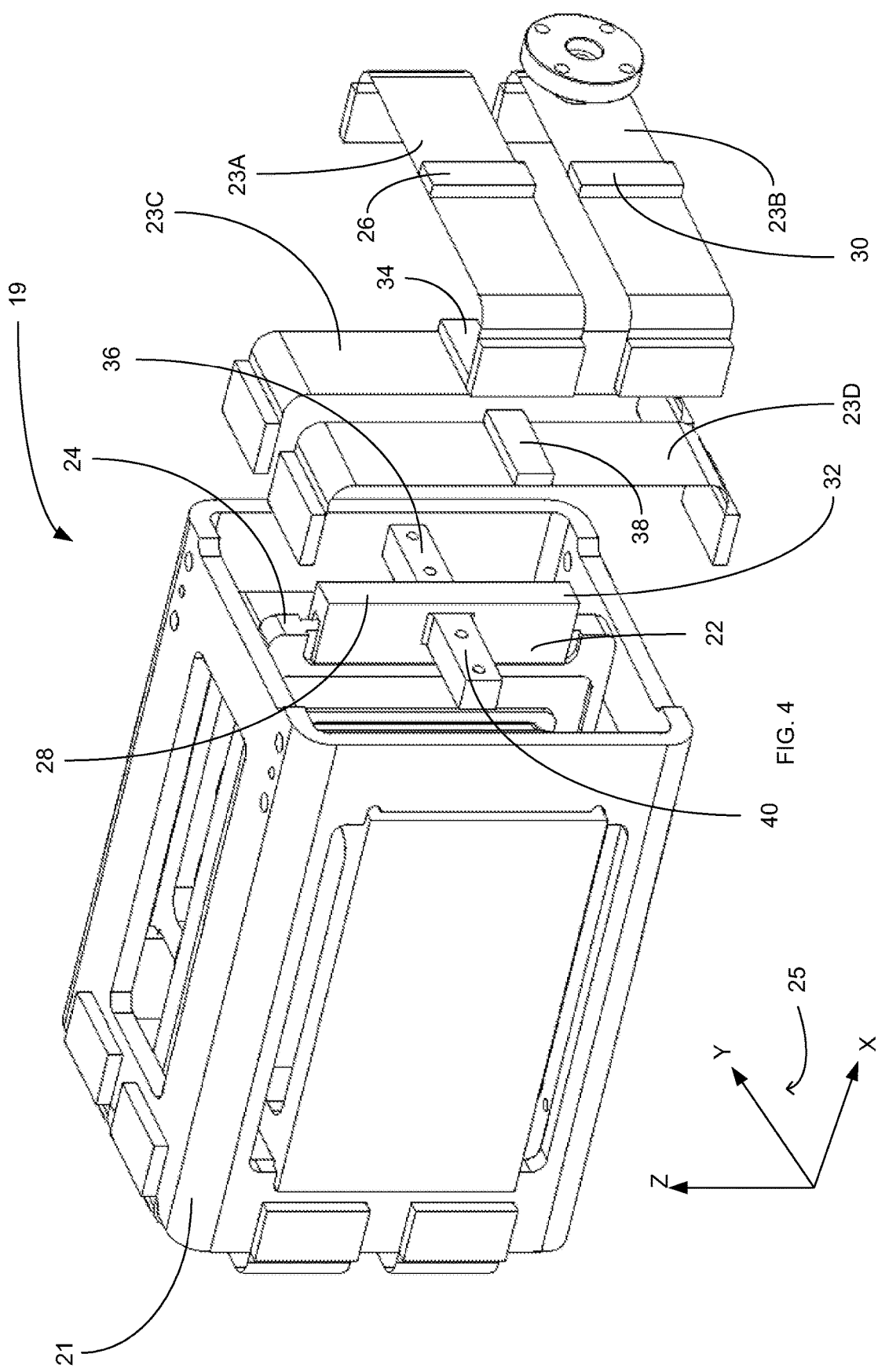
FIG. 4 is a partially exploded perspective view of the motor of FIG. 3.

Turning to FIG. 4, a cross-support 22 is secured to a first end of an armature 24 by, for example, rivets (not shown), welding, or an interference fit (or another suitable attachment method). A set of axes 25 is provided for reference. Note that a second end of the armature 24 includes a similar cross-support which is not visible in FIG. 4. Both ends of the motor 19 are substantially similar, so only one end will be described. A middle portion 26 of flexure 23A is connected to a portion 28 of the cross-support 22. A middle portion 30 of flexure 23B is connected to a portion 32 of the cross-support 22. A middle portion 34 of flexure 23C is connected to a portion 36 of the cross-support 22. A middle portion 38 of flexure 23D is connected to a portion 40 of the cross-support 22. Portions 36 and 40 of the cross-support 22 each have a pair of through holes for receiving rivets or bolts. In this case, through holes would need to be created in the middle portions 34 and 38 of the flexures 23C and 23D. The middle portions of the flexures are secured to the cross-support by, for example, rivets (not shown), bolts, welding or an epoxy (or another suitable attachment method). Flexures 23A-D are thus connected to a first end of the armature 24, and flexures 25A-D are connected to a second end of the armature 24. The longest portions of the flexures 23A-D and 25A-D reside in planes substantially parallel with each other.

Having a cross-flexure arrangement can make it challenging to connect the armature 24 to the outer flexure(s) (e.g. 23A, 23B). Splitting the inner flexure into two portions (e.g. 23C, 23D) and providing a gap between flexures 23C and 23D allows connection of the armature to the outer flexure(s) while maintaining symmetry (in another example, two inner flexures such as 23C, 23D can be used with a single outer flexure). This gap allows the portions 28 and 32 of the cross-support 22 to extend through this gap. This arrangement enables the flexures 23A and 23B to be connected to the portions 28 and 32 of the cross-support 22. Flexures 23A and 23B are also separated by a gap. The use of parallel flexures (e.g. 23A and 23B) increases the single axis stiffness along the long dimension of the flexures and across the width of the flexures. The cross-flexure arrangement (e.g. flexures 23A and 23C) allows the system to react external loads along two axes (e.g. the Y and Z axes) while allowing motion of the armature along a third axis (e.g. the X axis). Flexures 23A, 23B, 25A and 25B provide high stiffness in a direction parallel to a Z axis. Flexures 23C, 23D, 25C and 25D provide high stiffness in a direction parallel to a Y axis. The stiffness across the width of a particular flexure is higher than the stiffness along a longest dimension of that flexure. The flexure configuration described above provides rotational stiffness against moment loads about axes parallel to the Y and Z axes.

Figure 1:
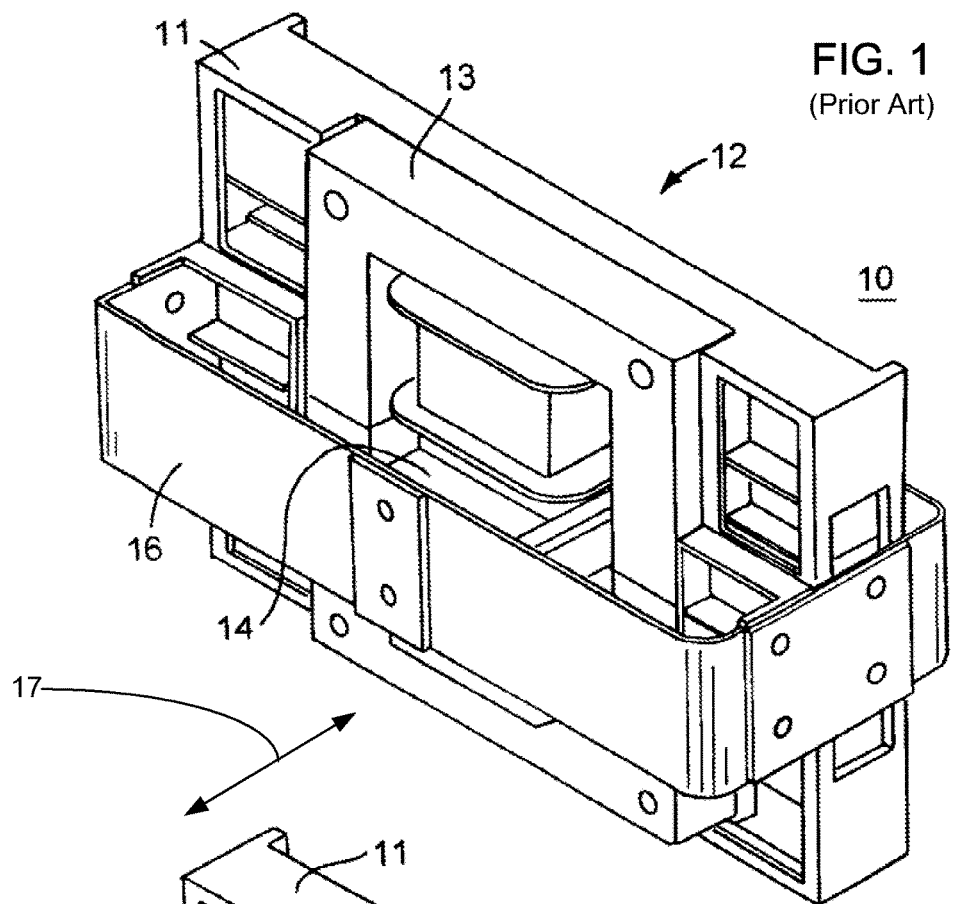
FIG. 1 is an isometric view of a prior art linear motor.
Figure 2:
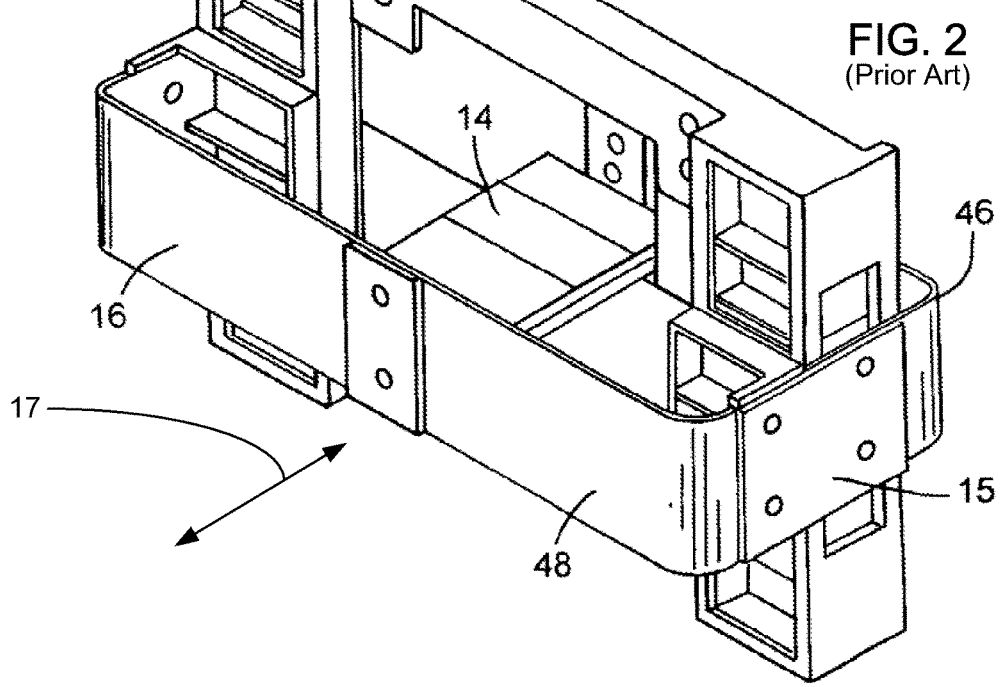
FIG. 2 is an isometric view of selected elements of the prior art motor assembly of FIG. 1.
Figure 5:
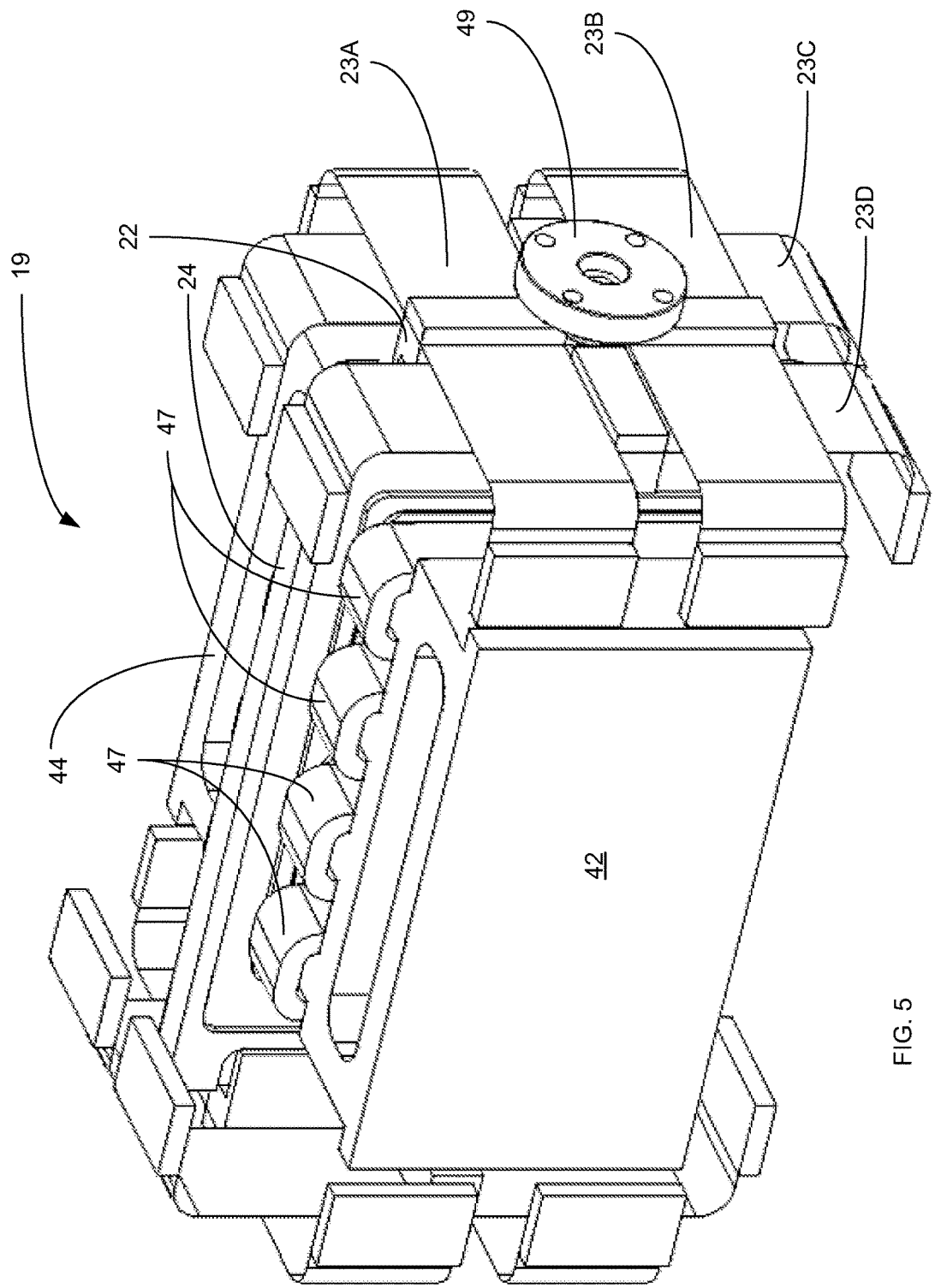
FIG. 5 is a perspective view of the motor of FIG. 3 in which an external housing of the motor has been removed.

Referring to FIG. 5, the housing of the motor 19 has been removed to facilitate viewing of the interior of the motor. The flexures 23A-D are back in the same positions as in FIG. 1. A pair of stator back irons 42 and 44 provides support for the stator coils of electrically conductive wire 47. The stator back irons are preferably made of a material which has high thermal conductivity, thereby facilitating removal of thermal energy generated in the wire coils. A load plate 49 is secured to the cross-support 22 (e.g. by welding) and thus the armature 24. The load plate 49 can be connected to an external load (not shown) on which the motor 19 can act.

Figure 6:
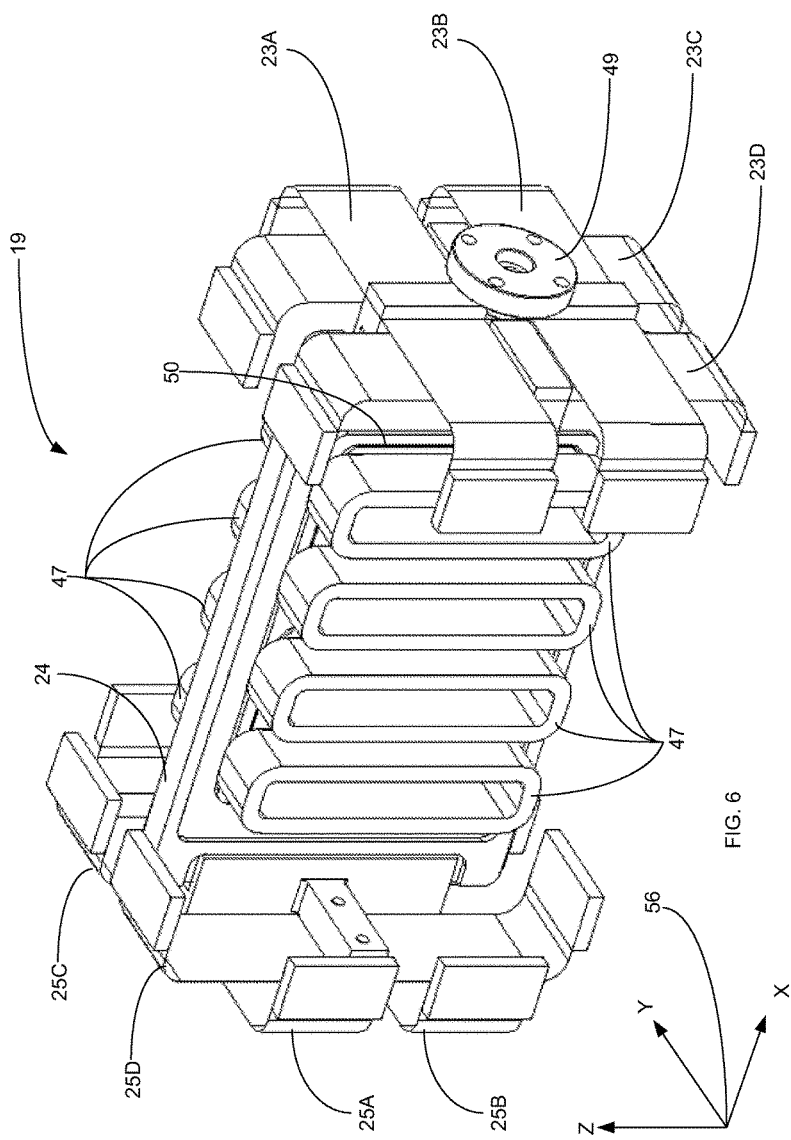
FIG. 6 is a perspective view of the motor of FIG. 5 in which stator back irons have been removed.

In FIG. 6 the stator back irons have been removed in order to facilitate viewing of the stator wire coils 47. During operation of the motor 19, magnetic fields from a magnetic assembly 50 that has one or more permanent magnets interact with the magnetic fields generated by the electrical current flowing in the stator wire coils 47. This interaction causes the armature 24 to move substantially linearly back and forth relative to the housing 21 in an intended direction of movement which is substantially parallel to the X axis of the coordinate axes system 56. A load connected to the load plate 49 will likewise be moved back and forth in the same intended direction.

As further shown in FIG. 6, each of the flexures 23A-D and 25A-D has a longest portion which lies substantially in a plane that intersects a plane in which the armature lies at a substantially right angle. Pairs of flexures have longest portions which lie in the same plane and are substantially parallel to each other. For example, flexures 23A and 23B have longest portions which lie in the same plane and are substantially parallel to each other. Each flexure has a longest portion which is skewed relative to a longest portion of four other flexures. For example, flexure 23A has a longest portion which is skewed relative to a longest portion of each of flexures 23C, 23D, 25C and 25D. The word "skewed" as used in this application means that a first flexure does not intersect a second flexure and is not parallel with the second flexure. Each flexure has a longest portion which is substantially parallel to the longest portions of two of the flexures on the opposite end of the armature (e.g. flexure 23A has a longest portion which is substantially parallel with the longest portions of flexures 25A and B). Flexures 23A-D and 25A-D allow motion of the armature 24 in the intended direction of movement while resisting motion of the armature in one or more other degrees of freedom (i.e. translation along a direction parallel to the Y and/or Z axes, and/or rotation about axes which are parallel to the X, Y and/or Z axes).

Figure 7:
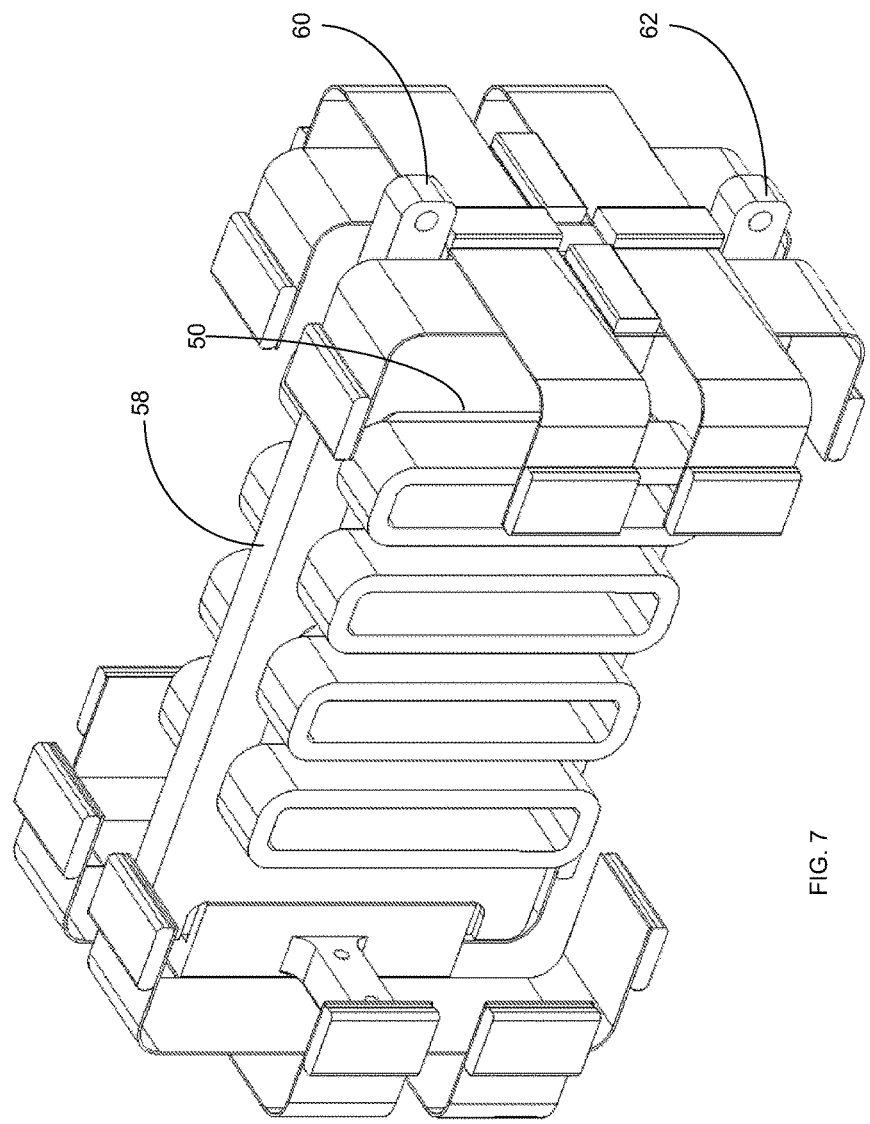
FIG. 7 is a perspective view of a motor similar to the motor of FIG. 6 in which the load plate has been removed and the armature frame has been modified.

Another example of an armature 58 is disclosed in FIG. 7. The other elements in FIG. 7 are substantially the same as in FIG. 6 except that the load plate 49 has been removed. The armature 58 is similar to the armature 24 except that the armature 58 has two modified corners 60 and 62 which are adapted to have an external load attached thereto. In this example there is a through hole at each corner 60 and 62 of the armature which allows the external load to be, for example, bolted to the corners 60 and 62. This arrangement attaches the armature to the external load at locations outside the magnet load path and directly onto a more structural part of the armature frame.

In another example, the stator coils 47 are attached to the load and the armature 24 containing the magnet assembly 50 is held in a fixed position relative to the housing. In this case the coils 47 are also connected to the flexures 23A-D and 25A-D so that the coils can move in the X direction. This is a moving voice coil motor as opposed to a moving magnet motor which is described above. To summarize, the linear electro-magnetic motor allows relative motion between the stator and the armature. In some examples the armature is coupled to the load to cause the load to move linearly, and in other examples the stator is coupled to the load to cause the load to move linearly.

It will be understood that additional modifications may be made without departing from the spirit and scope of the examples described herein, and, accordingly, other embodiments are within the scope of the following claims.

What is claimed is:

1. An electromagnetic motor, comprising:
a stator;
an armature having a permanent magnet and arranged to move substantially linearly relative to the stator in an intended direction during operation of the motor;
a first flexure connected to a first end of the armature; and
a second flexure connected to a second end of the armature, the permanent magnet being located between the first and second flexures, each flexure being a unitary piece, a longest portion of the first flexure is skewed relative to a longest portion of the second flexure, the flexures allowing motion of the armature in the intended direction while resisting motion of the armature in one or more other degrees of freedom.

2. The electromagnetic motor of claim 1, further comprising a third flexure connected to the first end of the armature, the third flexure (a) having a longest portion which is skewed relative to at least one of the longest portions of the first and second flexures, and (b) allowing motion of the armature in the intended direction while resisting motion of the armature in another degree of freedom.

3. The electromagnetic motor of claim 2, further comprising a fourth flexure connected to the first end of the armature, the fourth flexure (a) having a longest portion which is skewed relative to at least one of the longest portions of the first through third flexures, and (b) allowing motion of the armature in the intended direction while resisting motion of the armature in another degree of freedom.

4. The electromagnetic motor of claim 3, further comprising a fifth flexure connected to the first end of the armature, the fifth flexure (a) having a longest portion which is skewed relative to at least one of the longest portions of the first through fourth flexures, and (b) allowing motion of the armature in the intended direction while resisting motion of the armature in another degree of freedom.

5. The electromagnetic motor of claim 4, further comprising a sixth flexure connected to the second end of the armature, the sixth flexure (a) having a longest portion which is skewed relative to at least one of the longest portions of the first through fifth flexures, and (b) allowing motion of the armature in the intended direction while resisting motion of the armature in another degree of freedom.

6. The electromagnetic motor of claim 1, further including a housing, wherein each flexure has two end portions which are secured to the housing and a central portion which is secured to one of the first and second ends of the armature.

7. The electromagnetic motor of claim 1, further comprising:
   a first external load attachment point at a first corner of the armature, and a second external load attachment point at a second corner of the armature.

8. The electromagnetic motor of claim 1, further comprising a load plate secured to the first end of the armature.

9. The electromagnetic motor of claim 1, wherein the stator comprises a material which has a high thermal conductivity.

* * * * *